(12) United States Patent
Ohtani et al.

(10) Patent No.: US 7,109,778 B2
(45) Date of Patent: Sep. 19, 2006

(54) DC-OFFSET TRANSIENT RESPONSE CANCEL SYSTEM

(75) Inventors: Yutaka Ohtani, Hirakata (JP); Hiroshi Komori, Ohtsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 16 days.

(21) Appl. No.: 10/973,915

(22) Filed: Oct. 27, 2004

(65) Prior Publication Data

US 2005/0093608 A1     May 5, 2005

(30) Foreign Application Priority Data

Oct. 29, 2003    (JP)   ............... 2003-368854

(51) Int. Cl.
     *G01R 25/00*      (2006.01)
(52) U.S. Cl. ...................... 327/307; 327/309
(58) Field of Classification Search ............... 327/307, 327/9; 330/9
See application file for complete search history.

(56) References Cited

U.S. PATENT DOCUMENTS 5,926,066 A * 7/1999 Sauer ........................ 330/9
6,415,003 B1 * 7/2002 Raghavan ................. 375/317
2003/0142767 A1 * 7/2003 Ichihara .................... 375/344
2003/0156668 A1    8/2003 Atkinson et al. .......... 375/345
2003/0203727 A1   10/2003 Kluge et al. ................ 455/234

FOREIGN PATENT DOCUMENTS

JP      2002319989      10/2002
JP      2003224488       8/2003

OTHER PUBLICATIONS

European Search Report dated Feb. 2, 2005.

* cited by examiner

*Primary Examiner*—Timothy P. Callahan
*Assistant Examiner*—Khareem E. Almo
(74) *Attorney, Agent, or Firm*—Stevens, Davis, Miller & Mosher, LLP

(57) ABSTRACT

A high pass filter is disposed to an output part of a gain control amplifier. A gain control signal change detector detects a change of a gain control signal from the gain control amplifier. Upon detection of a change of the gain control signal, a counter and a clock generator generate a cancel pulse which has a certain width, and using the cancel pulse, a first switch cuts an AC signal which is fed to the gain control amplifier. Further, using the same cancel pulse, a second switch reduces the time constant of the high pass filter. Through this operation, a transient response of a DC offset is eliminated.

7 Claims, 11 Drawing Sheets

DC-OFFSET TRANSIENT RESPONSE CANCEL SYSTEM

BACKGROUND OF THE INVENTION

1. Field of the Invention

The present invention relates to a DC-offset transient response cancel system which cancels out a transient response of a DC offset which deteriorates the voice quality in a direct conversion system, i.e., a system which will be the mainstream system in the future for mobile telephones. A transient response of a DC offset worsens a bit error rate and makes it impossible to correctly decode a transmitted signal.

2. Background Art

Over the recent years, more and more mobile telephone systems are shifting from heterodoxy conversion systems to direct conversion systems which operate at low power and are advantageous to size reduction. However, a direct conversion system has a problem of a DC offset from which a heterodoxy conversion system is free.

A prior art on direct conversion systems will now be described.

FIG. 4 is a block diagram which shows the prior art on a direct conversion system. In FIG. 4, denoted at 1 is a low noise amplifier (linear amplifier). Denoted at 2 is a first capacitor for capacitance-coupling. Denoted at 3 is a demodulator which down-converts a high frequency signal (RF signal input) which is a received signal. Denoted at 4 is a first gain control amplifier (hereinafter referred to as a "GCA"). Denoted at 5 is a second capacitor for capacitance-coupling (having the capacitance of 200 pF for instance). Denoted at 6 is a first resistor (having the resistance value of 2000 kΩ for instance) which forms a high pass filter together with the second capacitor 5. Denoted at 7 is a second GCA. Denoted at 8 is a third capacitor for capacitance-coupling (having the capacitance of 200 pF for instance). Denoted at 9 is a second resistor (having the resistance value of 2000 kΩ for instance) which forms a high pass filter together with the third capacitor. Denoted at 10 is a third GCA. Denoted at 11 is a GCA control circuit which controls the gains of the GCA 4, the GCA 7 and the GCA 10 in accordance with a gain control signal GCV. Denoted at 24 is a first bias power source which applies through the first resistor 6 a bias voltage upon a signal after capacitance-coupling. Denoted at 25 is a second bias power source which applies through the second resistor 9 a bias voltage upon a signal after capacitance-coupling.

Operations of the direct conversion system having such a structure above will now be described. First, the RF signal amplified by the low noise amplifier 1 is capacitance-coupled by the first capacitor 2 and then fed to the demodulator 3. The demodulator 3 down-converts the RF signal, and the RF signal is accordingly frequency-converted to baseband and becomes an I/Q–BB (in phase/quadrant phase–baseband) signal. Thus frequency-converted signal is amplified by the GCA 4 to a desired level, capacitance-coupled by the second capacitor 5 and the first resistor 6, and then fed to the GCA 7 in a condition that the signal has a DC value set by the bias power source 24.

The signal is further amplified by the GCA 7 to a desired level, capacitance-coupled by the third capacitor 8 and the second resistor 9, and then fed to the GCA 10 in a condition that the signal has a DC value set by the bias power source 25.

The signal is amplified by the GCA 10 again to a desired level, and outputted as an RX–I/Q output (receipt–in phase/quadrature phase signal output).

The gains of the GCA 4, the GCA 7 and the GCA 10 are controlled via the GCA control circuit 11, referring to the gain control signal GCV which changes in accordance with the level of the RF signal.

FIG. 6A shows one example of the inside of the GCA control circuit 11. In FIG. 6A, denoted at 26 is a gain control signal generator for the GCA 4. Denoted at 27 is a gain control signal generator for the GCA 7. Denoted at 28 is a gain control signal generator for the GCA 10. The gain control signal generators 26, 27 and 28 generate gain control signals respectively for the GCA 4, the GCA 7 and the GCA 10 in accordance with the gain control signal GCV. The signal timing is as shown in the timing chart in FIG. 6B.

The GCA control circuit 11 maybe an analog control circuit which controls while referring to a voltage for instance, or a logic control circuit which controls serially for example.

However, the prior art above gives rise to a problem when a DC offset is created in the circuit because of a variation among elements. In short, owing to the capacitance-coupling, static operations lead to no problem. Despite this, when the input level of the RF signal abruptly changes, that is, when the gains of the GCA 4, the GCA 7 and the GCA 10 suddenly change as the gain control signal GCV suddenly changes, a DC-offset transient response is created. The waveforms at the respective portions will now be described with reference to FIG. 5A. FIG. 5A shows a base band part alone. For simplicity of illustration, AC components are omitted from the waveforms which are shown in FIG. 5A.

An example that the gains of the GCA 4, the GCA 7 and the GCA 10 grow at some moment will now be described on the assumption that the GCA 4, the GCA 7 and the GCA 10 have positive input offsets which are attributed to variations. First, as the gain of the GCA 4 changes, the DC level rises at that moment, and therefore, the output from the GCA 4 becomes as denoted at a waveform 12. As the DC value having the waveform 12 passes the capacitor 5, the DC value becomes as denoted at a waveform 13. Since a baseband signal exists even at frequencies close to DC, for the purpose of lowering the cut-off frequency of the high pass filter, the time constants of the capacitor 5 and the resistor 6 must be large. Because of this, the waveform 13 needs time until the DC level reaches a steady value. In other words, after momentarily growing following the DC value having the waveform 12, the DC level gradually returns to the original DC value. In the GCA 7 as well, the DC value becomes as denoted at a waveform 14 since the DC level grows in response to a change in gain. As the DC value having the waveform 14 passes the capacitor 8, the DC value becomes as denoted at a waveform 15 through similar operations to those described above. Also in the GCA 10, the DC value becomes as denoted at a waveform 16 since the DC level grows in response to a change in gain. On this occasion, the time the DC value takes before settling at a steady value after changing is a transient response. A DC-offset transient response arises in this manner. The timing of each waveform is as shown in the timing chart in FIG. 5B.

SUMMARY OF THE INVENTION

An object of the present invention is to provide a DC-offset transient response cancel system which eliminates a DC-offset transient response and accordingly sets a DC value to a steady value instantaneously.

To achieve the object, the DC-offset transient response cancel system according to the present invention uses a circuit which detects a change of a gain control signal. The DC-offset transient response cancel system further uses a counter and a clock generator which are for generating a cancel pulse which has a certain width after detecting a change of the gain control signal. The DC-offset transient response cancel system still further uses a switch which cuts a signal at the timing of the cancel pulse, and also a switch which shorts a resistor which is involved in later-stage capacitance-coupling (high pass filter) at the timing of the cancel pulse. This permits cutting an AC signal only right after a change in gain and accordingly reducing the time constant of the high pass filter, which in turn realizes elimination of a transient response of a DC offset.

This will now be described specifically. A DC-offset transient response cancel system according to a first invention comprises; a gain control amplifier; a high pass filter which is disposed to an output part of the gain control amplifier; and a gain control signal change detector which detects a change of a gain control signal which controls the gain of the gain control amplifier. Only when the gain control signal change detector detects a change of the gain control signal, the time constant of the high pass filter is reduced for a certain period of time since the change of the gain control signal. In this fashion, a DC-offset transient response at the time of a change in gain is cancelled.

In the structure according to the first invention, in the event that a demodulator is disposed in front of the gain control amplifier, it is preferable to block a signal in front of the demodulator when a DC-offset transient response is cancelled.

Alternatively, in the structure according to the first invention, it is preferable that a threshold value for detection used by the gain control signal change detector can be freely set.

Further, in the structure according to the first invention, it is preferable that the period in which the time constant of the high pass filter is reduced can be freely set.

In a DC-offset transient response cancel system according to a second invention, a high pass filter is disposed to an output part of the gain control amplifier. The high pass filter is formed by a capacitor and a resistor for capacitance-coupling. A first switch which shorts the resistor is disposed, and a second switch is disposed which blocks a signal which is input to the gain control amplifier. A pulse generator turns on and off the first and the second switches.

The pulse generator above may be a pulse generating circuit which detects a change of the gain control signal and generates a pulse which turns on and off the first and the second switches.

Alternatively, other example of the pulse generator may have the following structure. That is, a pulse generating circuit which detects a change of the gain control signal generates a detection pulse, a counter generates a pulse which has a certain width when triggered by the detection pulse from the pulse generating circuit. This turns on and off the first and the second switches. At this stage, a clock generator generates an operation clock for the counter from a reference signal.

The present invention makes it possible to decrease the time constant of the high pass filter during a certain period of time since the gain control signal has changed. This eliminates a transient response of a DC offset which will degrade the voice quality. In this manner, an excellent DC-offset transient response cancel system is realized.

DETAILED DESCRIPTION OF THE PREFERRED EMBODIMENTS

An embodiment of the present invention will now be described with reference to the associated drawings.

(First Embodiment)

Figure 1:
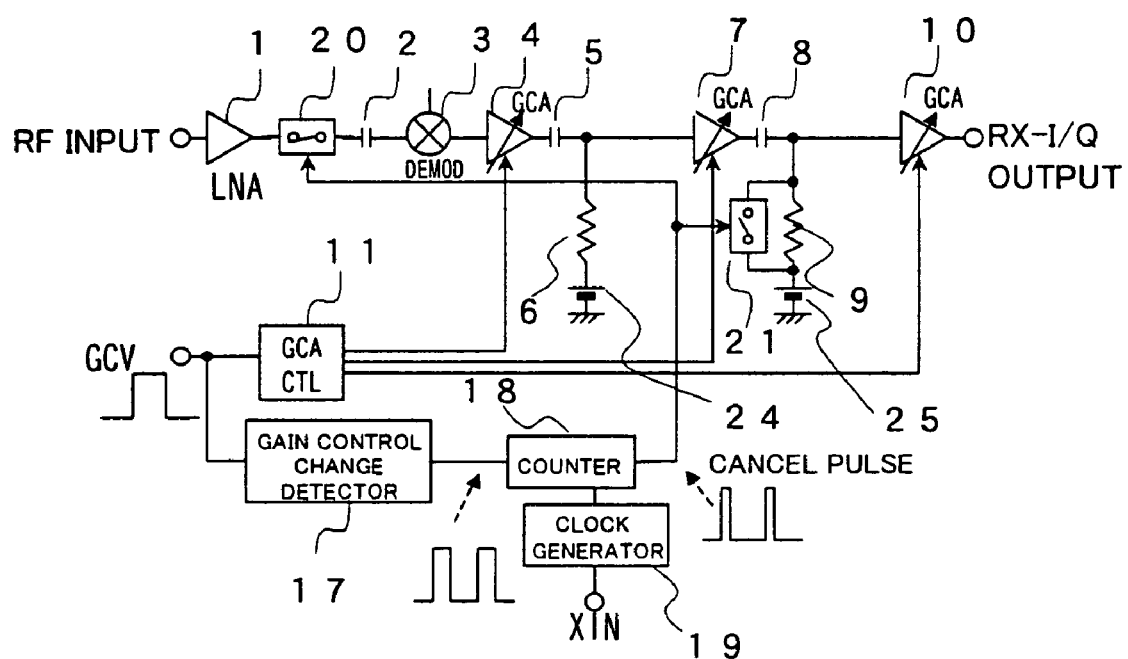
FIG. 1 is a block diagram of a DC-offset transient response cancel system according to a first embodiment of the present invention.

FIG. 1 is a block diagram which shows the structure of a DC-offset transient response cancel system according to a first embodiment of the present invention. In FIG. 1, denoted at 17 is a gain control signal change detector. Denoted at 18 is a counter which generates a cancel pulse which has a certain width after the gain control signal change detector 17 has detected a change of a gain control signal. Denoted at 19 is a clock generator which generates clocks which are to be used by the counter 18 from a reference signal XIN. Denoted at 20 is a first switch which turns on and off in accordance with the high level and the low level of the cancel pulse for the purpose of blocking an AC signal. Denoted at 21 is a second switch which turns on and off at the same timing as the switch 20, in order to short a resistor 9.

A low noise amplifier 1, a second capacitor 2, a demodulator 3, a first GCA 4, a second capacitor 5, a first resistor 6, a second GCA 7, a third capacitor 8, a second resistor 9, a third GCA 10, a GCA control circuit 11 and bias power sources 24 and 25 are the same as those according to the prior art.

Operations of the DC-offset transient response cancel system according to this embodiment having such a structure will now be described.

First, the gain control signal change detector 17 detects a change of a gain control signal GCV. When the gain control signal GCV increases or decreases by a certain value or more, the gain control signal change detector 17 generates a detection signal.

Figure 7A:
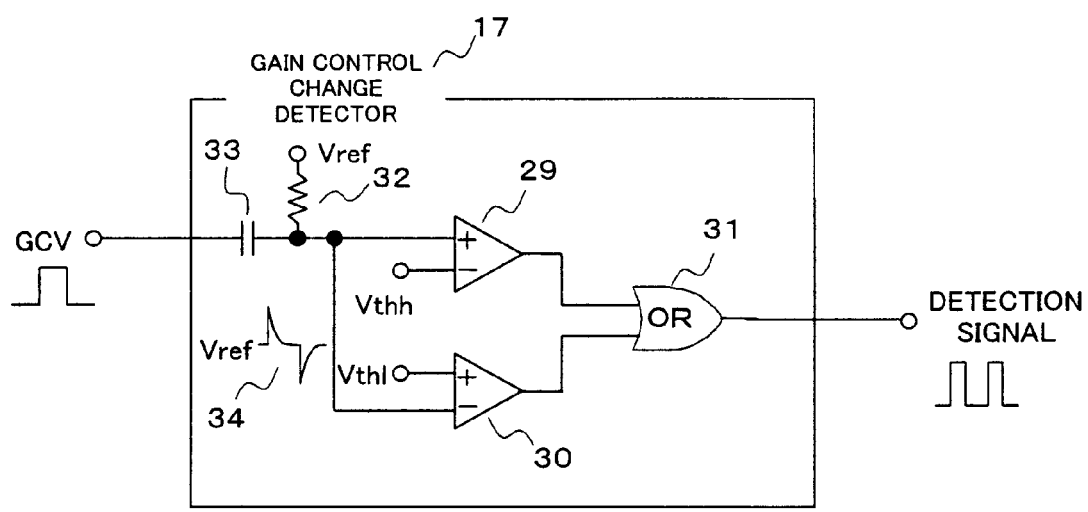
FIG. 7A is a block diagram which shows the inside of a gain control signal change detector.
Figure 7B:
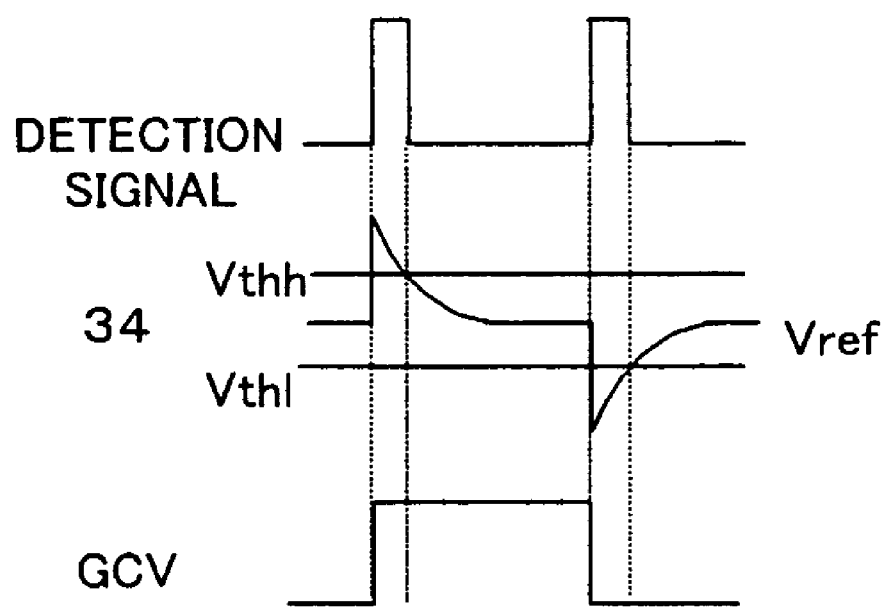
FIG. 7B is a timing chart of internal signals inside the gain control signal change detector.

FIG. 7A shows an example of the inside of the gain control signal change detector 17. Denoted at 29 is a first comparator. Denoted at 30 is a second comparator. Denoted at 31 is an OR circuit. Denoted at 32 is a resistor. Denoted at 33 is a capacitor. It is first assumed that a rectangular wave as that shown in FIG. 7A is input as the gain control signal GCV. It is also assumed that the larger the amplitude of the rectangular wave is, the larger a gain change becomes. After passing the capacitor 33, the rectangular wave GCV is applied with a voltage Vref via the resistor 32 and becomes as denoted at a waveform 34 which refers to the voltage Vref as a reference voltage. The waveform 34 is fed to the comparator 29, and when the waveform 34 exceeds a threshold voltage Vthh, the comparator 29 outputs the high level. The waveform 34 is fed also to the comparator 30, and when the waveform 34 is smaller than a threshold voltage Vthl, the comparator 30 outputs the high level. The outputs from the comparators 29 and 30 are fed to the OR circuit 31, and the OR circuit 31 outputs, as a detection signal, a signal which rises to the high level while the output from either one of the comparators 29 and 30 remains at the high level. Through the series of operations, it is possible to detect a change in gain. The timing of each signal is as shown in the timing chart in FIG. 7B.

While the foregoing has described the gain control signal as a voltage, serial logic control may be implemented. Such logic may be used which gives rise to a detection pulse when a pre-change gain control signal and a post-change gain control signal change by a predetermined value or more.

Next, the counter 18 generates a cancel pulse which has a certain width, when triggered by detection signal. For a counting operation, the counter 18 refers to the clocks generated by the clock generator 19.

And the switch 20 has turned off based on the cancel pulse, thereby the AC signal (RF signal) is cut only during the duration of the cancel pulse after the gain control signal has changed. The switch 21 turns on concurrently with cutting of the AC signal, and the resistor 9 is accordingly shorted. As the resistor 9 is shorted, the time constant of a high pass filter which used to be formed by the capacitor 8 and the resistor 9 decreases. In consequence, the DC value of rear side of the capacitor 8 instantaneously becomes a fixed DC value (the electric potential at the bias power source 25). In short, a transient response of a DC offset is cancelled.

Figure 2:
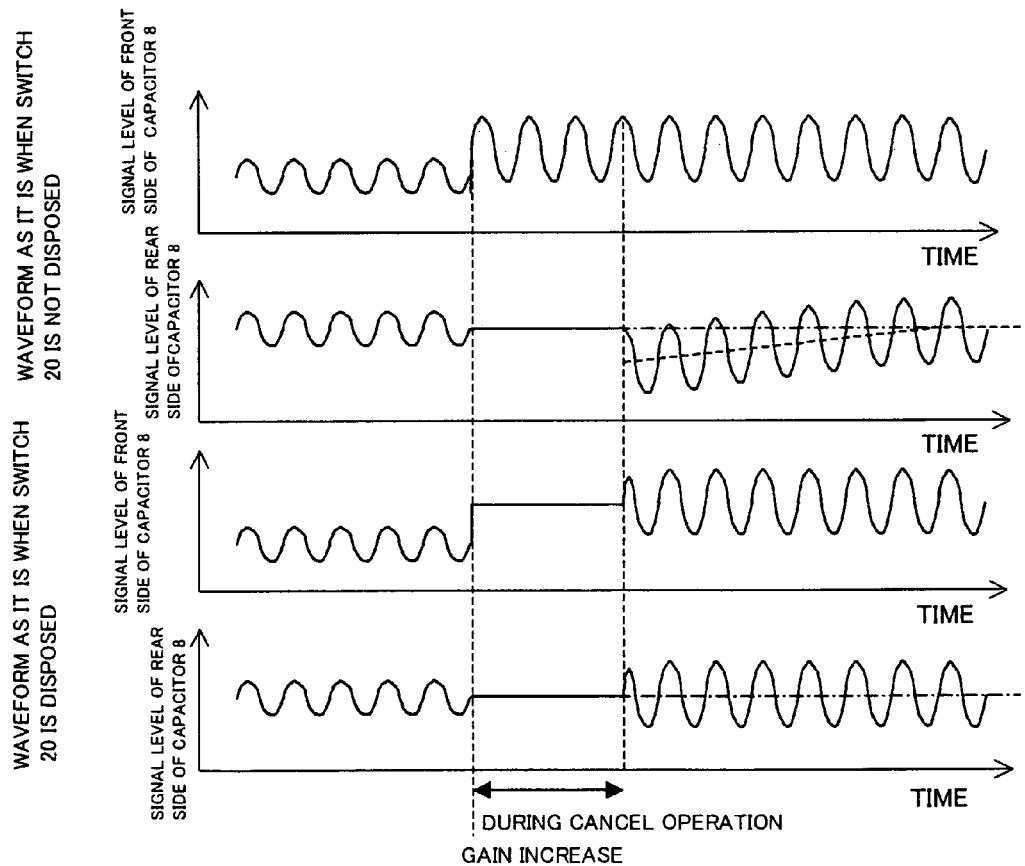
FIG. 2 is a waveform diagram of signal waveforms of front and rear sides of a capacitor 8 shown in FIG. 1 in the event that a switch 20 is disposed and in the event that a switch 20 is not disposed.

The AC signal is cut, in order to coincide an average DC value of the AC signal as it is after the end of the cancel operation with the DC value fixed during the cancel operation. The following operation takes place in the event that the switch 20 is not disposed and the AC signal remains active as shown in FIG. 2. That is, when the AC signal stays even at the end of the cancel operation, the average DC value and the DC value in a steady state become different from each other. Since the time constants of the capacitor 8 and the resistor 9 are large, it takes time for the DC values to coincide with each other, ending up in a DC-offset transient response. As the cancel pulse ends, the switch 20 turns on while the switch 21 turns off and the normal operation comes in.

For comparison, FIG. 2 also shows the waveforms of front and rear sides of the capacitor 8 in the event that the switch 20 is disposed. For simplicity, FIG. 2 ignores a DC transient response up to the capacitor 8.

Figure 3A:
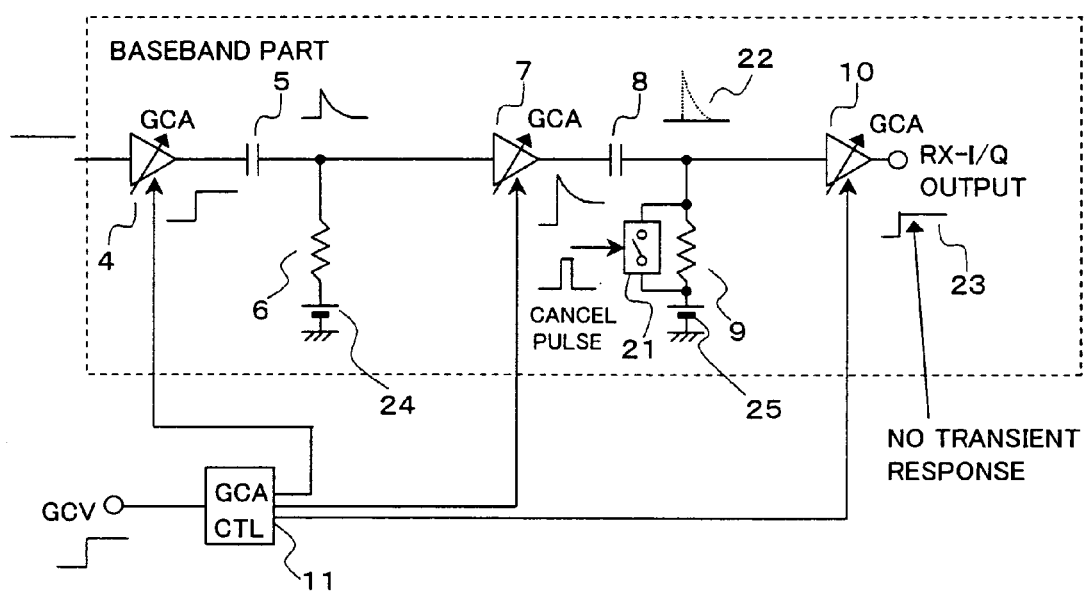
FIG. 3A is an explanatory diagram for describing the signal waveforms at the respective portions shown in FIG. 1.
Figure 3B:
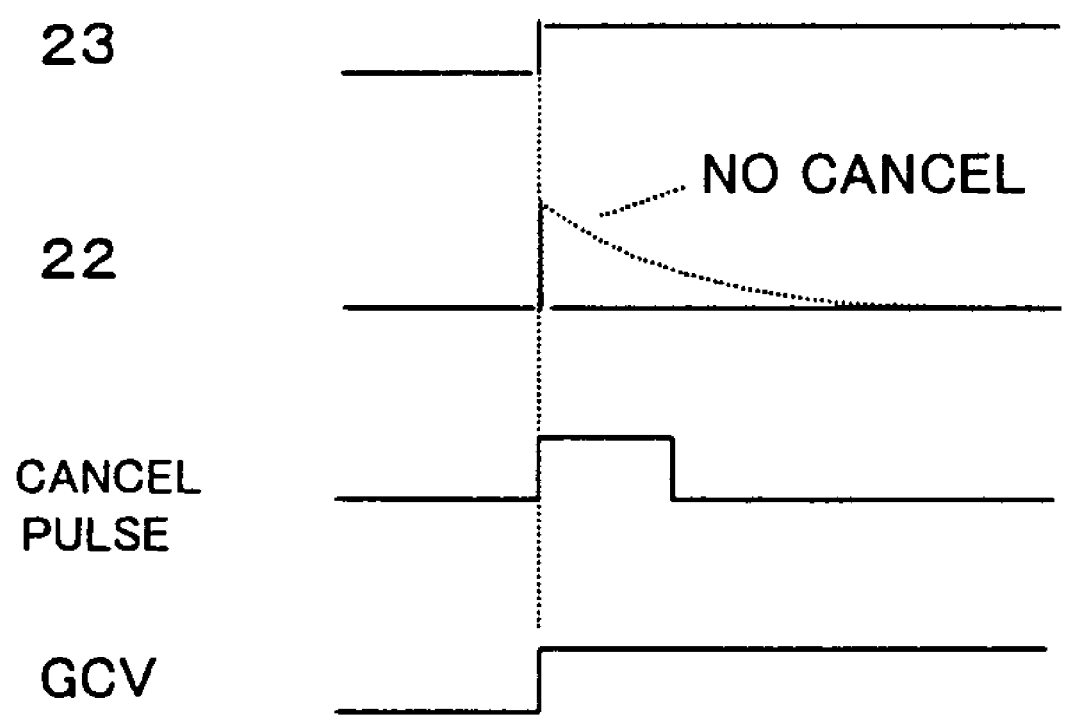
FIG. 3B is a timing chart of the signal waveforms at the respective portions shown in FIG. 1.
Figure 4:
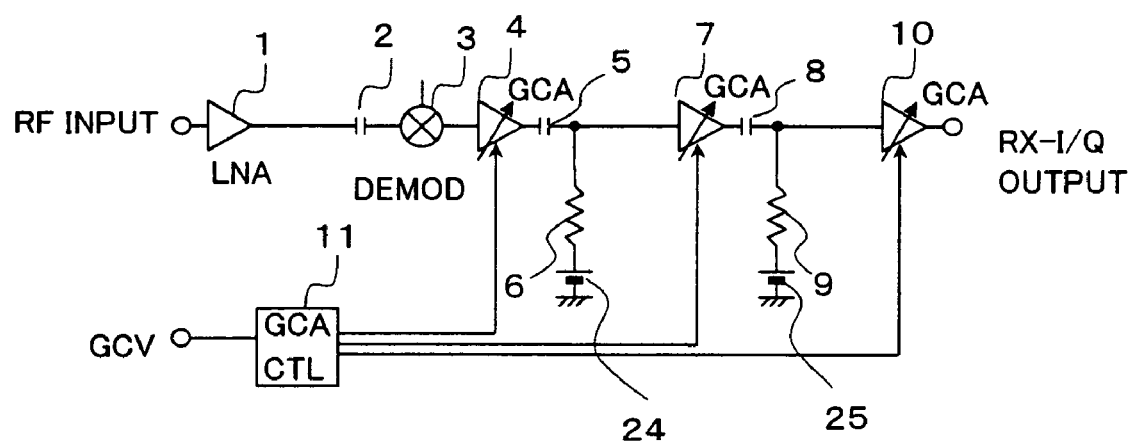
FIG. 4 is a block diagram of a prior art regarding direct conversion systems.
Figure 5A:
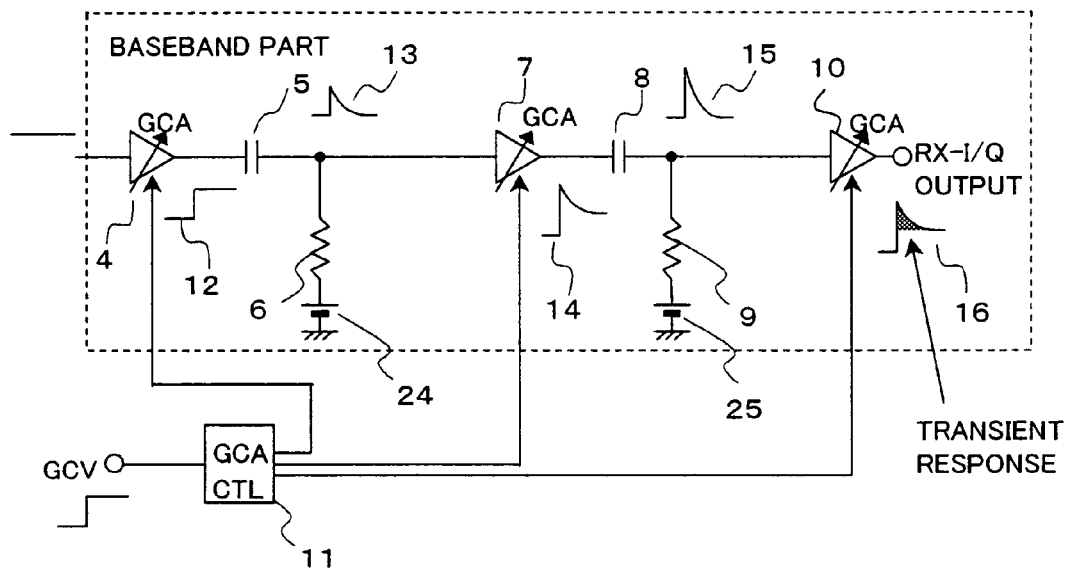
FIG. 5A is an explanatory diagram for describing the signal waveforms at the respective portions shown in FIG. 4.
Figure 5B:
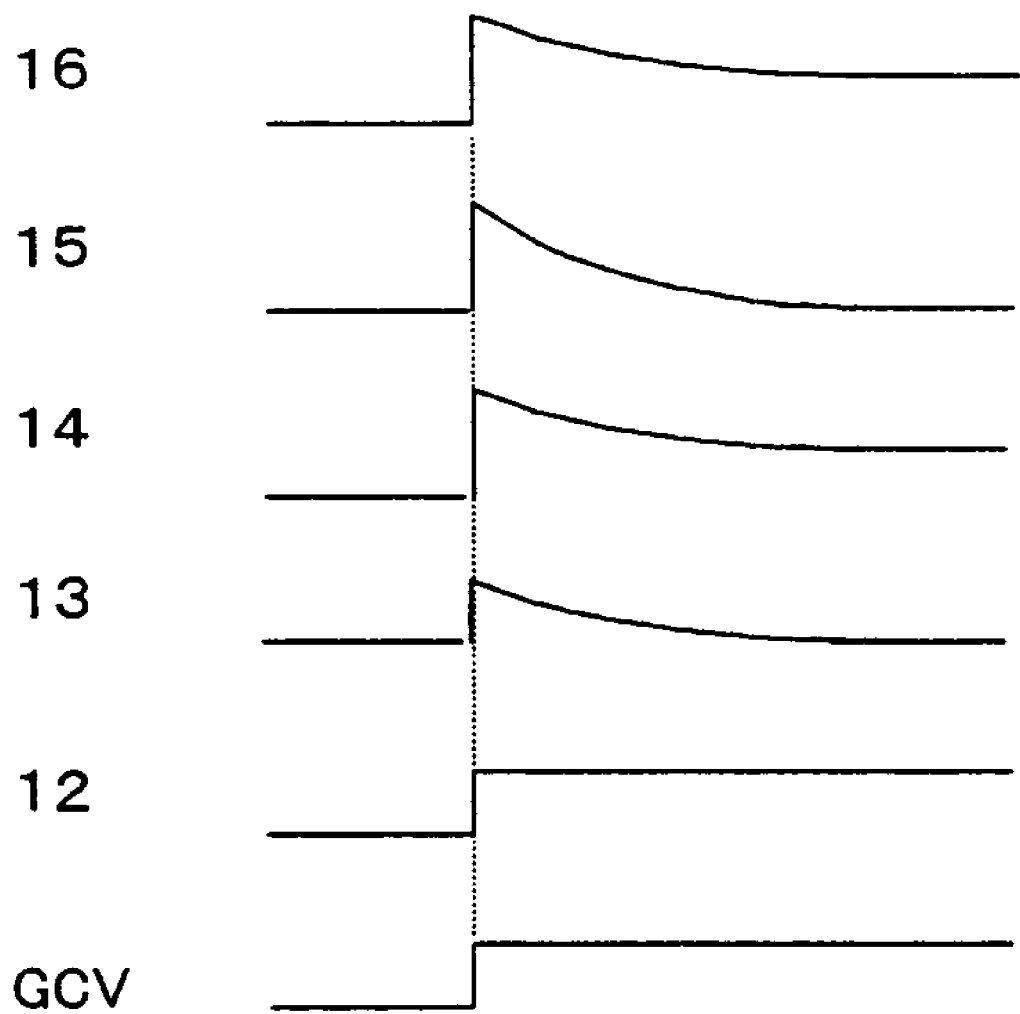
FIG. 5B is a timing chart of the signal waveforms at the respective portions shown in FIG. 4.
Figure 6A:
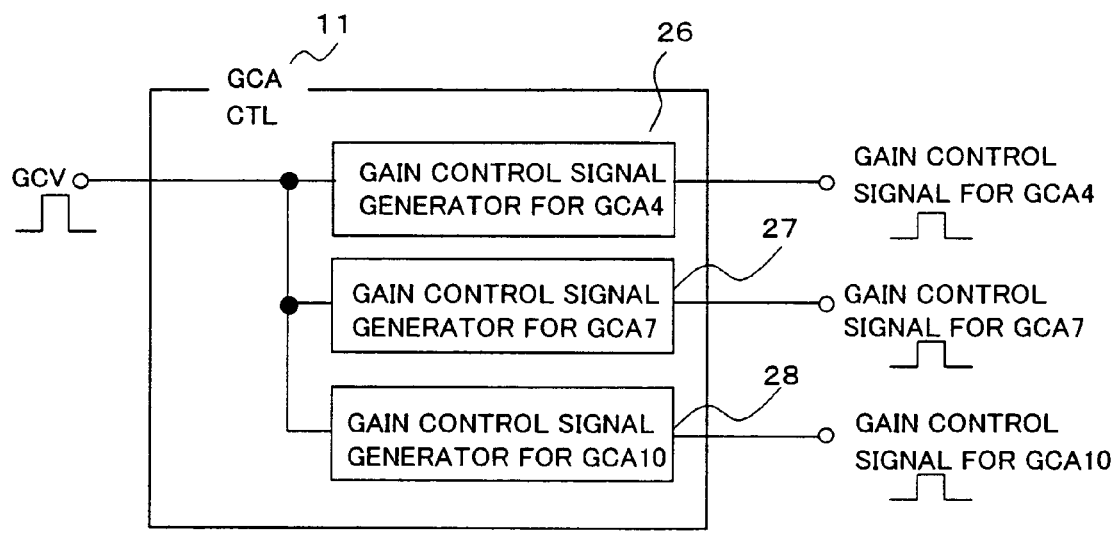
FIG. 6A is a block diagram which shows the inside of a GCA control circuit.
Figure 6B:
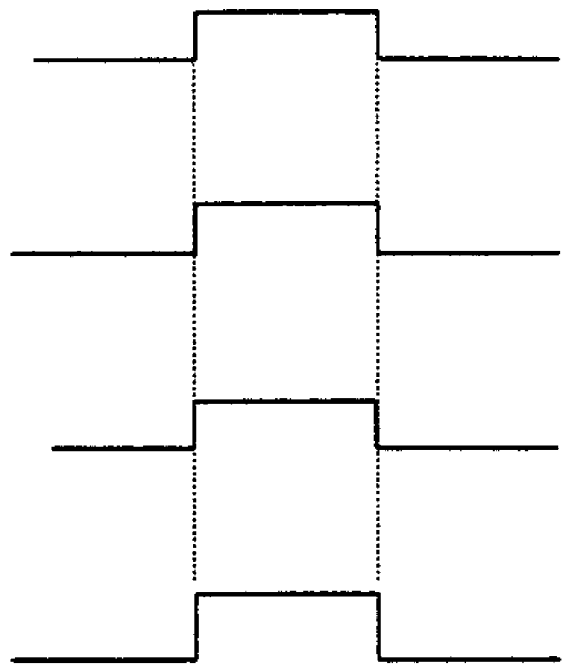
FIG. 6B is a timing chart of internal signals inside the GCA control circuit.

FIG. 3A shows the waveforms in an example of the operation. Up to the capacitor 8 is exactly the same as that according to the prior art. The cancel pulse having the certain width turns on the switch 21 after a change in gain, and the resistor 9 is shorted, which forcedly fixes the DC value of rear side of the capacitor 8. Since the DC value does not change even after the switch 21 has turned off, the DC value becomes as denoted at a waveform 22. Although a DC offset is created as the gain changes in the GCA 10 after this, a transient response as that according to the prior art will not arise, and therefore, the DC value of an RX–I/Q output voltage becomes as denoted at a waveform 23. The timing of each waveform is as shown in the timing chart in FIG. 3B.

As described above, according to this embodiment, a change of the gain control signal GCV is detected and the switches 20 and 21 turn on only for a certain period of time after the detection. This ensures that a DC-offset transient response is cancelled only within the system without any supply of a cancel signal from outside.

The threshold value for detecting a change of the gain control signal may be set to any desired value. Hence, such control may be implemented that the DC-offset transient response cancel operation is not executed when a change in gain is 10 dB or less and the DC-offset transient response cancel operation is executed when a change in gain is 10 dB or more. Thus, the cancel operation can be executed only when the tolerance value for DC-offset transient response is surpassed. This prevents deterioration of the bit error rate which is attributed to drop out of the AC signal caused by an unwanted cancel operation.

Further, since the width of the cancel pulse as well can be freely set, it is possible to freely set the cancel period (i.e., the period in which the AC signal is cut). With the cancel period set to such a period during which cutting of the AC signal is tolerated in the system or shorter, it is possible to prevent deterioration of the bit error rate attributable to the lack of the AC signal.

As described above, this DC-offset transient response cancel system comprises the gain control signal change detector 17, the counter 18 which can freely set the width of the cancel pulse when triggered by the detection signal from the gain control signal change detector 17, the clock generator 19, the switch 20 which turns on and off in accordance with the cancel pulse and accordingly cuts the AC signal, and the switch 21 which shorts the resistor. Thus, an excellent DC-offset transient response cancel system is obtained which is capable of eliminating a transient response of a DC offset which deteriorates the voice quality.

INDUSTRIAL APPLICABILITY

The DC-offset transient response cancel system according to the present invention is applicable to a direct conversion system, which is a mobile telephone system which demands elimination of a transient response of a DC offset which deteriorates the voice quality, etc.

The invention claimed is:

1. A DC-offset transient response cancel system, comprising:
    a gain control amplifier;
    a high pass filter which comprises a capacitor and a resistor for capacitance-coupling and which is disposed to an output part of said gain control amplifier;
    a shorting component that is capable of electrically shorting the resistor of the high pass filter; and
    a gain control signal change detector which detects a change of a gain control signal which controls the gain of said gain control amplifier, wherein:
    only when said gain control signal change detector detects a change of said gain control signal, said resistor is shorted by the shorting component for a certain period of time from the change of said gain control signal so as to cancel a DC-offset transient response at the time of the detected change in said gain control signal.

2. The DC-offset transient response cancel system of claim 1, further comprising:
a demodulator that is connected to the front of said gain control amplifier to provide a signal thereto; and
a blocking component that blocks a signal provided to the demodulator when the DC-offset transient response is cancelled.

3. The DC-offset transient response cancel system of claim 1, wherein a threshold value for detection used by said gain control signal change detector can be freely set.

4. The DC-offset transient response cancel system of claim 1, wherein the period during which the resistor is shorted can be freely set.

5. A DC-offset transient response cancel system, comprising:
a gain control amplifier;
a high pass filter which comprises a capacitor and a resistor for capacitance-coupling and which is disposed to an output part of said gain control amplifier;
a first switch which shorts said resistor;
a second switch which blocks a signal which is input to said gain control amplifier; and
a pulse generating circuit which turns on and off said first and said second switches.

6. A DC-offset transient response cancel system, comprising:
a gain control amplifier;
a high pass filter which comprises a capacitor and a resistor for capacitance-coupling and which is disposed to an output part of said gain control amplifier;
a first switch which shorts said resistor;
a second switch which blocks a signal which is input to said gain control amplifier; and
a pulse generating circuit which detects a change of said gain control signal and generates a pulse which turns on and off said first and said second switches.

7. A DC-offset transient response cancel system, comprising:
a gain control amplifier;
a high pass filter which comprises a capacitor and a resistor for capacitance-coupling and which is disposed to an output part of said gain control amplifier;
a first switch which shorts said resistor;
a second switch which blocks a signal which is input to said gain control amplifier;
a pulse generating circuit which detects a change of said gain control signal and generates a detection pulse;
a counter which generates a pulse which has a certain width, which is for turning on and off said first and said second switches, when triggered by said detection pulse; and
a clock generator which generates an operation clock for said counter from a reference signal.

* * * * *